US012749931B2

(12) United States Patent
Garcia Gallegos et al.

(10) Patent No.: US 12,749,931 B2
(45) Date of Patent: Sep. 29, 2026

(54) # FLEXIBLE STATOR FOR ELECTRIC MOTOR

(71) Applicant: Empowering the Future (ETF), New Brighton, MN (US)

(72) Inventors: Jesus Hazael Garcia Gallegos, New Brighton, MN (US); Jose Alfredo Mendez Cabanas, New Brighton, MN (US); Anselmo Marquez Montiel, New Brighton, MN (US); Mary Margaret Jung Reagan, New Brighton, MN (US)

(73) Assignee: Empowering the Future (ETF), New Brighton, MN (US)

( * ) Notice: Subject to any disclaimer, the term of this patent is extended or adjusted under 35 U.S.C. 154(b) by 1129 days.

(21) Appl. No.: 17/592,651

(22) Filed: Feb. 4, 2022

(65) Prior Publication Data

US 2022/0263354 A1 Aug. 18, 2022

Related U.S. Application Data

(63) Continuation of application No. PCT/US2021/017972, filed on Feb. 12, 2021.

(51) Int. Cl.
*H02K 1/02* (2006.01)
*C08L 83/04* (2006.01)

(52) U.S. Cl.
CPC ................ *H02K 1/02* (2013.01); *C08L 83/04* (2013.01); *C08L 2312/00* (2013.01)

(58) Field of Classification Search
CPC .......... H02K 1/02; H02K 1/146; C08L 83/04; C08L 2312/00; C08L 83/00; C08G 77/04; C08G 77/12; C08G 77/20; C08K 3/38
See application file for complete search history.

(56) References Cited

U.S. PATENT DOCUMENTS 6,426,380 B1 * 7/2002 Bovensiepen .......... C08L 83/04 528/31
2002/0070627 A1 * 6/2002 Ward .................... H02K 1/145 310/254.1

(Continued)

FOREIGN PATENT DOCUMENTS

CN 107312313 11/2017
JP 2008135560 A 6/2008

(Continued)

OTHER PUBLICATIONS

PCT International Preliminary Report on Patentability for PCT Application No. PCT/US2021/017972 mailed Aug. 15, 2023 (7 pages).

(Continued)

*Primary Examiner* — Doris L Lee
(74) *Attorney, Agent, or Firm* — Merchant & Gould P.C.

(57) ABSTRACT

The present disclosure provides compositions and methods related to a flexible ferromagnetic stator. A composition comprises a curable silicon-containing composition comprising an organosiloxane compound and a curing agent/cross-linker and a plurality of magnetic particulates. The composition upon curing in a mold forms an elastomeric ferromagnetic stator that is capable of generating a magnetic field, which can improve electrical motor performance and reduce energy consumption when used in couple with a counterpart rotary component.

16 Claims, 3 Drawing Sheets

(56) References Cited

U.S. PATENT DOCUMENTS

| | | | |
|---|---|---|---|
| 2009/0152009 A1 | 6/2009 | Slay et al. | |
| 2010/0079015 A1 | 4/2010 | Hoshina et al. | |
| 2011/0014297 A1* | 1/2011 | Lee | A61K 9/5015 604/23 |
| 2011/0070111 A1 | 3/2011 | Slay et al. | |
| 2015/0105492 A1* | 4/2015 | Chen | C08J 3/05 523/404 |
| 2016/0009006 A1 | 1/2016 | Mizuta et al. | |
| 2016/0024358 A1 | 1/2016 | Zambova | |
| 2020/0340087 A1 | 10/2020 | Suetsuna et al. | |

FOREIGN PATENT DOCUMENTS

| | | |
|---|---|---|
| KR | 20120037289 A | 4/2012 |
| WO | 2015/150545 A1 | 10/2015 |
| WO | 2019/022448 A1 | 1/2019 |

OTHER PUBLICATIONS

PCT International Search Report and Written Opinion for PCT Application No. PCT/US2021/017972 mailed Nov. 9, 2021 (12 pages).

* cited by examiner

FLEXIBLE STATOR FOR ELECTRIC MOTOR

CROSS-REFERENCE TO RELATED APPLICATIONS

This application is a continuation of International Application No. PCT/US2021/017972 filed 12 Feb. 2021, which application is hereby incorporated by reference in its entirety.

INTRODUCTION

The field of the disclosure generally relates to compositions, materials, and methods related to a stator or a stator assembly used in electric machines.

Rotary systems or assemblies are commonly used in electric generators, electric motors, engines, or other powered systems. A rotor assembly or a motor assembly generally comprises a rotating component and a stator. The stator is the stationary part of the rotor assembly. Energy flows through a stator to or from the rotating component of the system. For example, in an electric motor, the stator provides a rotating magnetic field that drives the rotating armature; in a generator, the stator converts the rotating magnetic field to electric current; in fluid powered devices, the stator guides the flow of fluid to or from the rotating part of the system.

Depending on the configuration of a spinning electromotive device the stator may act as the field magnet, interacting with the armature to create motion, or it may act as the armature, receiving its influence from moving field coils on the rotor. The stator of these devices may be either a permanent magnet or an electromagnet, which could generate magnetic field sufficient to perform functions.

Conventionally, the electric motor design and construction utilizes a solid stator/rotor based on metal or metal alloy such as Fe/Si. These mechanically rigid components often lose energy or force, and/or generate defects over a long time period, in part because the metal-based stators/rotors create friction and cause material and energy loss via heat, which in turns increases electricity consumption (input) to maintain a consistent force (output).

Polymeric or elastomeric materials have been used to make non-metallic, low cost, light-weight stators. Such stators may also have inorganic nanoparticles as fillers to reinforce the physical or mechanical properties of the stators and prolong the duration of thereof.

For example, US 20090152009 disclosed a nanoparticle reinforced polymer element of a stator and rotor assembly for a power section of a positive displacement fluid motor or a progressive cavity pump. The use of chemically functionalized nanoparticles improves the chemical and physical characteristics of the polymer used for the stator.

WO2019022448A1 discloses a stator having a stator core, which has a polymer compound based on a conductive nanomaterial, and is a composite material including a conductive nanomaterial and a resin.

US20110070111A1 discloses composite-based stators having a stator housing and a stator lining, which is preferably made of a tough and durable resilient polymer material and optionally doped with fillers or nanoparticles such as carbon black and/or silica particles.

WO2015150545A1 teaches a stator having a ferromagnetic core for an electric rotary machine, wherein said ferromagnetic core comprises a compound comprising a polymer matrix composition and a functional filler, the functional filler comprising a material selected from ferromagnetic material, magnetic material, and a combination thereof.

In spite of the above disclosures, it is still highly desirable for new compositions and methods regarding flexible stators that have improved flexibility and magnetic property, low cost, long lifetime, and manufacturing feasibility and convenience.

SUMMARY OF DISCLOSURE

In some aspects, the present disclosure relates to a composition for making a flexible stator. The composition comprises a silicon-containing composition and a plurality of magnetic particulate. The silicon-containing composition may be a curable composition comprising an organosiloxane compound and a curing agent/cross-linker. Upon mixing and curing, the silicon-containing composition undergoes polymerization or crosslinking, forming a cross-linked or partially cross-linked elastomeric polymer matrix with magnetic particulates incorporated and distributed therein. In some embodiments, the organosiloxane compound is from about 20 wt % to about 80 wt %, or from about 30 wt % to about 70 wt %, or from about 40 wt % to about 60 wt %, based on the total weight of the composition.

The silicon-containing compositions that may be used include, but are not limited to, hydrosilylation-curable silicone compositions, peroxide curable silicone compositions, condensation-curable silicone compositions, epoxy-curable silicone compositions; alkene-curable silicone compositions, acrylate-curable compositions, radical reaction-curable composition, ultraviolet radiation-curable silicone compositions, high-energy radiation-curable silicone compositions, and organo-silicone compositions with the same functionalities.

In some embodiments, the magnetic particulates used herein comprise a metal element selected from a group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof. In some embodiments, the magnetic particles may further comprise a chalcogen element selected from the group consisting of sulfur (S), selenium (Se), tellurium (Te), oxygen (O) and combinations thereof. In some embodiments, the magnetic particulates include magnetite fillings, iron fillings, or both.

In some embodiments, the magnetic particulates have an average particle size of about 1 nm to about 1,000 micron, or from about 10 nm to about 100 micron, or from about 100 nm to about 10 micron, or about 200 nm to about 1 micron. In some embodiments, the magnetic particulates have an average particle size of about no greater than 1 micron, or no greater than 500 nm, or no greater than 250 nm, or no greater than 200 nm, or no greater than 100 nm, or no greater than 50 nm, or no greater than 10 nm, or no greater than 5 nm.

In some embodiments, the magnetic particulates are in a range from about 20 wt % to about 80 wt %, or from about 30 wt % to about 70 wt %, or from about 40 wt % to about 60 wt %, based on the total weight of the composition.

In some embodiments, the composition further comprises one or more additives selected from a compatibilizer, a colorant, a UV stabilizer, an antioxidant, a process aid, a flame retardant, a heat stabilizer, an impact modifier, a moisture scavenger, an inhibitor, an odor mask, a filler, or combinations thereof.

In some aspects, the present disclosure relates to a flexible and ferromagnetic stator comprising an elastomeric polymer matrix and the magnetic particulates incorporated and distributed in the polymer matrix. In some embodiments, the elastomeric polymer matrix of the flexible stator is a cross-linked or partially cross-linked polydimethylsiloxane (PDMS), derived from the silicon-containing composition and the magnetic particulates described herein.

In some embodiments, the magnetic particulates may be homogeneously distributed, or substantially homogeneously distributed, in the polymer matrix or the finished stator. In other embodiments, the magnetic particulates may be heterogeneously distributed, or substantially heterogeneously distributed, in the polymer matrix or the finished stator. In certain embodiments, the magnetic particulates are substantially aligned in the polymer matrix of the flexible stator.

In some embodiments, wherein the flexible stator is capable of generating a detectable magnetic field in the easy axis, or in the difficult axis, or both. In embodiments, the strength of the magnetic field generated by the flexible stator is of at least about 125 μT, at least about 500 μT, at least about 1,000 μT, at least about 2,000 μT, at least about 3,000 μT, or at least about 5,000 μT, or at least about 10,000 μT, in the easy axis, or in the difficult axis, or both.

In some aspects, the present disclosure relates to a method of making the flexible and ferromagnetic stator as described herein. In general, the method comprises forming a mixture by mixing a curable silicon-containing composition and a plurality of magnetic particulate; adding the mixture into a mold; and curing the mixture, thereby forming the stator, wherein the magnetic particulates are distributed in the stator, and wherein the stator is ferromagnetic.

In some embodiments, the curable silicon-containing composition comprises a curable or cross-linkable organosiloxane compound and a curing agent/cross-linker as described herein. In embodiments, the silicon-containing composition may be in a form of a two-part kit, with the organosiloxane compound as a monomer or a base in one container and the curing agent or cross-linker in a separate container. In embodiments of the present method, forming the mixture further comprises mixing the cross-linkable organosiloxane compound and the curing agent/cross-linker homogeneously and subsequently adding the magnetic particulates.

In some embodiments, the present method may further comprise adding to the mixture one or more additives as described herein.

In some embodiments, the present method further comprises spreading the mixture evenly throughout the mold and eliminating air entrapment in the mixture prior to curing.

In some embodiments, the mixture is cured at a temperature from about 10° C. to about 200° C., or from about 23° C. to about 180° C., or from about 50° C. to about 150° C., or from about 80° C. to about 150° C., or from about 100° C. to about 120° C. for about 10 minutes to about 48 hours, or from about 30 minutes to about 24 hours, or from about 1 hour to about 12 hours, or from about 2 hours to about 6 hours.

In some embodiments, the curing of the mixture is allowed to take place in an external magnetic field to further promote the alignment of the magnetic particulates in the mixture.

Selected Definitions

As used herein, "weight percent," "wt %," "percent by weight," "% by weight," and variations thereof refer to the concentration of a substance as the weight of that substance divided by the total weight of the composition and multiplied by 100. It is understood that, as used here, "percent," "%," and the like are intended to be synonymous with "weight percent," "wt %," etc.

As used herein, "g" represents gram; "L" represents liter; "mg" represents "milligram ($10^{-3}$ gram);" "mL" represents milliliter ($10^{-3}$ liter); "cm" represents centimeter ($10^{-2}$ meter); "mm" represents millimeter ($10^{-3}$ meter); "inch" is used as a length unit, and one inch equals to about 2.54 cm; "centipoise" or "cPs" or "cP" is used as a viscosity unit, and 1 cP=$10^{-3}$ Pa·s=1 mPa·s. The temperature unit used herein is degree Celsius (° C.).

The term "about" is used in conjunction with numeric values to include normal variations in measurements as expected by persons skilled in the art, and is understood have the same meaning as "approximately" and to cover a typical margin of error, such as ±10% of the stated value. The term "about" also encompasses amounts that differ due to different equilibrium conditions for a composition resulting from a particular initial composition. Whether or not modified by the term "about," the claims include equivalents to the quantities.

It should be noted that, as used in this specification and the appended claims, the singular forms "a," "an," and "the" include plural referents unless the content clearly dictates otherwise. Thus, for example, reference to a composition containing "a compound" includes having two or more compounds that are either the same or different from each other. It should also be noted that the term "or" is generally employed in its sense including "and/or" unless the content clearly dictates otherwise.

In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

The term "substantially free" may refer to any component that the composition of the disclosure lacks or mostly lacks. When referring to "substantially free" it is intended that the component is not intentionally added to compositions of the disclosure. Use of the term "substantially free" of a component allows for trace amounts of that component to be included in compositions of the disclosure because they are present in another component. However, it is recognized that only trace or de minimus amounts of a component will be allowed when the composition is said to be "substantially free" of that component. Moreover, the term if a composition is said to be "substantially free" of a component, if the component is present in trace or de minimus amounts it is understood that it will not affect the effectiveness of the composition. It is understood that if an ingredient is not expressly included herein or its possible inclusion is not stated herein, the disclosure composition may be substantially free of that ingredient. Likewise, the express inclusion of an ingredient allows for its express exclusion thereby allowing a composition to be substantially free of that expressly stated ingredient.

The processes, methods, and compositions of the present disclosure may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed processes and compositions.

"Magnet" used herein refers to a material or object that produces a magnetic field. This magnetic field is invisible but is responsible for the most notable property of a magnet: a force that pulls on other ferromagnetic materials, such as iron, steel, nickel, cobalt, etc., and attracts or repels other magnets. "Ferromagnetic" or "ferrimagnetic" materials refer to materials that can be magnetized, which are also the ones that are strongly attracted to a magnet. These include the elements iron, nickel and cobalt and their alloys, some alloys of rare-earth metals, and some naturally occurring minerals such as lodestone. "Magnetization" or "magnetic polarization" used herein refers to the vector field that expresses the density of permanent or induced magnetic dipole moments in a magnetic material. Ferromagnetic and ferrimagnetic materials have strong magnetization in a magnetic field and can be magnetized to have magnetization in the absence of an external field, becoming a permanent magnet. "Magnetic field" used herein refers to the magnetic flux density (also called magnetic B field). The strength of the magnetic B field is given in teslas (T). By definition, a particle, carrying a charge of one coulomb, and moving perpendicularly through a magnetic field of one tesla, at a speed of one meter per second, experiences a force with magnitude one newton. One micron tesla (μT) equals to $10^{-6}$ T.

"Magnetite" used herein generally refers to a mineral, one of the two common naturally occurring oxides of iron (chemical formula $Fe_3O_4$) and a member of the spinel group.

"Particulate" used herein refers to a particle generally in a nano- or micro-scale dimension or both with having various shapes, configurations, geometries, forms, morphologies, and surface textures. A particulate could be spherical, or substantially spherical. Other morphologies are also possible, including but not limited to prism, rod, cage, tube, fiber, core-shell, hollowed structure, etc. A microparticle is typically sized from about 1 micron to about 2,000 micron. A nanoparticle is typically sized from about 1 nm to about 1,000 nm. Individual particulates may aggregate to form a larger configuration on micro- or milli-scale.

The "magnetic particulate" or "magnetic particle" used herein is not particularly limited and generally includes any nano- or micro-sized magnetic particles (e.g., about 1 nm to about 2000 micron) that can be magnetized with an external magnetic/electrical field. More specifically, the magnetic particle can have a particle size ranging from about 1 nm to about 1,000 nm (e.g., at least 1, 2, 10, 20, 50, 100, 200, 300, 500, 800, or 1000 nm and/or up to 200, 300, 400, 500, 600, 800, or 1,000 nm), or from about 1 micron to about 2,000 micron (e.g., at least 1, 2, 10, 20, 50, 100, 200, 300, 500, 800, 1,000, or 2,000 micron and/or up to 200, 300, 400, 500, 600, 800, 1,000, or 2,000 micron), where the particle size ranges can represent a range for the average particle size (e.g., a number-, volume-, or weight-based average particle size) and/or the particle size ranges can represent the span of the distribution (e.g., such as for all or substantially all particles; such as between the 10% and 90% sizes of the cumulative size distribution). The magnetic particles more could include superparamagnetic particles, which particles can be easily magnetized with an external magnetic field.

BRIEF DESCRIPTION OF THE DRAWINGS

FIG. 3(*a*) shows an image of a sample at 50 nm scale (upper left) and zoomed pictures of a magnetic particulate (upper right) at 5 nm scale and 1 nm scale respectively. FIG. 3(*b*) shows an image of another sample at 100 nm scale (bottom left) and a zoomed picture of a magnetic particulate (bottom right) at 2 nm.

DETAILED DESCRIPTION

Figure 1B:
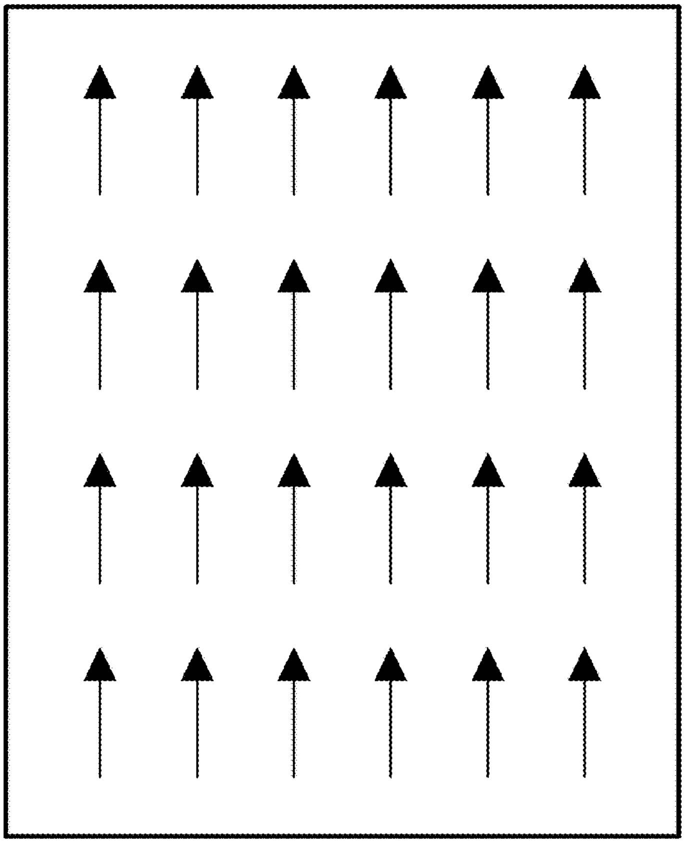
FIG. 1B illustrates the ordered ferromagnetic particles that are substantially aligned in response to an external magnetic field.

The present disclosure provides compositions and methods related to a flexible and ferromagnetic stator. The present stator utilizes a unique geometry adaptation of the magnetite/iron particulate filling materials in a flexible elastomers that allows faster responses (increased-sensitivity) and higher intensities, which reduces the operation speed with a decrease in the energy consumption with low chemical reactivity, low toxicity, better thermal stability, and hydrophobicity resulting in longer service life in temperatures ranging from −100 to 250° C. The present stator provides a number of advantages. It can be used in couple with counterpart rotary component in a motor/rotor assembly for applications such as electric generator or a power section of a positive displacement fluid motor or a progressive cavity pump, or others. The present stator may have a high resistance to heat and abrasion, a low coefficient of friction, high durability, may sustain repeated stress and strain loading without premature failure. More importantly, compared to conventional metal-based rigid stator, the present flexible stator made of a composite of elastomer matrix and magnetite/iron fillings has combined flexibility and ferromagnetic property. The present stator can advantageously generate a magnetic field and/or respond to an external magnetic field to achieve increased power output (in electricity generation), improved efficiency (less electricity consumed and less energy lost via heat from metal friction), and enhanced sensitivity (faster response). In particular, stators made of elastomer magnetite/iron filling composite have a faster operating response than that of a solid stator made of Fe/Si alloy, which reduces the electric current consumption for its activation. Moreover, the stator does not need the presence of channels to remove the heat from the stator core since the polymer/elastomer has better heat dissipation capabilities. Additionally, the stator core does not need to be laminated, nor is it required that the stator contain interspaced laminations. Further, according to the geometry and the size of the magnetite particle, the stator-rotor system containing the present stator becomes more efficient, has prolonged duration, and produces less defect upon long-time use. It is important to emphasize that the modification of the geometry of the magnetite particles substantially modifies the way in which the system responds to the application of the electric field. The present flexible stator can be used in, but not limited to, electric motors, electric generators and rotors, among others.

Composition for Flexible Stators

In some aspects, the present disclosure relates to a composition for making a flexible stator. The composition comprises a silicon-containing composition and a plurality of magnetic particulate. The silicon-containing composition may be a curable composition comprising an organosiloxane compound and a curing agent/cross-linker. In some embodiments, the silicon-containing composition may be in a form of a two-part kit, with the organosiloxane compound as a monomer or a base in one container and the curing agent or cross-linker in a separate container. When using, the organosiloxane compound and the curing agent are combined or mixed in a desired ratio, allowing the cross-linking or polymerization to occur.

Examples of silicon-containing compositions that may be used include, but are not limited to, hydrosilylation-curable silicone compositions, peroxide curable silicone compositions, condensation-curable silicone compositions, epoxy-curable silicone compositions, alkene-curable silicone compositions, acrylate-curable compositions, radical reaction-curable composition, ultraviolet radiation-curable silicone compositions, high-energy radiation-curable silicone compositions, and organo-silicone compositions with the same functionalities. The curable silicon-containing compositions may include monomers or oligomers (less than 10 repeat units or degree of polymerization (DP)) or polymers (higher than 10 DP) having curable or cross-linkable functionality. Examples of such monomers or oligomers or polymers include, but are not limited to, polysiloxanes (linear, branched, resins, and the like), block copolymers containing segments of siloxane repeat units and organic repeat units, and silicon-modified oligomers or polymers.

Curable silicon-containing compositions and methods for their preparation are known in the art. For example, a suitable hydrosilylation-curable silicone composition typically comprises (i) an organosiloxane containing an average of at least two silicon-bonded alkenyl groups per molecule, (ii) an organohydrogensiloxane containing an average of at least two silicon-bonded hydrogen atoms per molecule in an amount sufficient to cure the composition, and (iii) a hydrosilylation catalyst as the curing agent. The hydrosilylation catalyst can be any of the known hydrosilylation catalysts comprising a platinum group metal, a compound containing a platinum group metal, or a microencapsulated platinum group metal-containing catalyst. Platinum group metals include platinum, rhodium, ruthenium, palladium, osmium and iridium. Preferably, the platinum group metal is platinum, based on its high activity in hydrosilylation reactions.

The hydrosilylation-curable silicone composition may be an one-part composition or a multi-part composition comprising the components in two or more parts. Room-temperature vulcanizable (RTV) compositions typically comprise two parts, one part containing the organosiloxane and catalyst and another part containing the organohydrogensiloxane and any optional ingredients. Hydrosilylation-curable silicone compositions that cure at elevated temperatures can be formulated as one-part or multi-part compositions. For example, liquid silicone rubber (LSR) compositions are typically formulated as two-part systems. One-part compositions typically contain a platinum catalyst inhibitor to ensure adequate shelf life. A suitable peroxide-curable silicone composition typically comprises (i) an organosiloxane and (ii) an organic peroxide. Examples of organic peroxides include, diaroyl peroxides such as dibenzoyl peroxide, di-p-chlorobenzoyl peroxide, and bis-2,4-dichlorobenzoyl peroxide; dialkyl peroxides such as di-t-butyl peroxide and 2,5-dimethyl-2,5-di-(t-butylperoxy)hexane; diaralkyl peroxides such as dicumyl peroxide; alkyl aralkyl peroxides such as t-butyl cumyl peroxide and 1,4-bis(t-butylperoxyisopropyl) benzene; and alkyl aroyl peroxides such as t-butyl perbenzoate, t-butyl peracetate, and t-butyl peroctoate.

A condensation-curable silicone composition typically comprises (i) an organosiloxane containing an average of at least two hydroxy groups per molecule; and (ii) a tri- or tetra-functional silane containing hydrolysable Si—O or Si—N bonds. Examples of silanes include alkoxysilanes such as $CH_3Si(OCH_3)_3$, $CH_3Si(OCH_2CH_3)_3$, $CH_3Si(OCH_2CH_2CH_3)_3$, $CH_3Si[O(CH_2)_3CH_3]_3$, $CH_3CH_2Si(OCH_2CH_3)_3$, $C_6H_5Si(OCH_3)_3$, $C_6H_5CH_2Si(OCH_3)_3$, $C_6H_5Si(OCH_2CH_3)_3$, $CH_2{=}CHSi(OCH_3)_3$, $CH_2{=}CHCH_2Si(OCH_3)_3$, $CF_3CH_2CH_2Si(OCH_3)_3$, $CH_3Si(OCH_2CH_2OCH_3)_3$, $CF_3CH_2CH_2Si(OCH_2CH_2OCH_3)_3$, $CH_2{=}CHSi(OCH_2CH_2OCH_3)_3$, $CH_2{=}CHCH_2Si(OCH_2CH_2OCH_3)_3$, $C_6H_5Si(OCH_2CH_2OCH_3)_3$, $Si(OCH_3)_4$, $Si(OC_2H_5)_4$, and $Si(OC_3H_7)_4$; organoacetoxysilanes such as $CH_3Si(OCOCH_3)_3$, $CH_3CH_2Si(OCOCH_3)_3$, and $CH_2{=}CHSi(OCOCH_3)_3$; organoiminooxysilanes such as $CH_3Si[O{-}N{=}C(CH_3)CH_2CH_3]_3$, $Si[O{-}N{=}C(CH_3)CH_2CH_3]_4$, and $CH_2{=}CHSi[O{-}N{=}C(CH_3)CH_2CH_3]_3$; organoacetamidosilanes such as $CH_3Si[NHC({=}O)CH_3]_3$ and $C_6H_5Si[NHC({=}O)CH_3]_3$; aminosilanes such as $CH_3Si[NH(s\text{-}C_4H_9)]_3$ and $CH_3Si(NHC_6H_{11})_3$; and organoaminooxysilanes. A condensation-curable silicone composition can also contain a condensation catalyst to initiate and accelerate the condensation reaction. Examples of condensation catalysts include, but are not limited to, amines; and complexes of lead, tin, zinc, and iron with carboxylic acids. Tin (II) octoates, laurates, and oleates, as well as the salts of dibutyl tin, are particularly useful. The condensation-curable silicone composition can be a one-part composition or a multi-part composition comprising the components in two or more parts. For example, room-temperature vulcanizable (RTV) compositions can be formulated as one-part or two-part compositions. In the two-part composition, one of the parts typically includes a small amount of water.

A suitable epoxy-curable silicone-containing composition typically comprises (i) an organosiloxane containing an average of at least two epoxy-functional groups per molecule and (ii) a curing agent. Examples of epoxy-functional groups include 2-glycidoxyethyl, 3-glycidoxypropyl, 4-glycidoxybutyl, 2, (3,4-epoxycyclohexyl)ethyl, 3-(3,4-epoxycyclohexyOpropyl, 2,3-epoxypropyl, 3,4-epoxybutyl, and 4,5-epoxypentyl. Examples of curing agents include anhydrides such as phthalic anhydride, hexahydrophthalic anhydride, tetrahydrophthalic anhydride, and dodecenylsuccinic anhydride; polyamines such as diethylenetriamine, triethylenetetramine, diethylenepropylamine, N-(2-hydroxyethyl) diethylenetriamine, N,N'-di(2-hydroxyethyl)diethylenetriamine, m-phenylenediamine, methylenedianiline, aminoethyl piperazine, 4,4-diaminodiphenyl sulfone, benzyldimethylamine, dicyandiamide, and 2-methylimidazole, and triethylamine; Lewis acids such as boron trifluoride monoethylamine; polycarboxylic acids; polymercaptans; polyamides; and amidoamines. A suitable ultraviolet radiation-curable silicone composition typically comprises (i) an organosiloxane containing radiation-sensitive functional groups and (ii) a photoinitiator. Examples of radiation-sensitive functional groups include acryloyl, methacryloyl, mercapto, epoxy, and alkenyl ether groups. The type of photoinitiator depends on the nature of the radiation-sensitive groups in the organosiloxane. Examples of photoinitiators include diaryliodonium salts, sulfonium salts, acetophenone, benzophenone, and benzoin and its derivatives.

A suitable radical reaction curable silicone-containing composition typically comprises (i) an organosiloxane containing an average of at least two unsaturated carbon-carbon bonds per molecule and (ii) a curing agent. The unsaturated carbon-carbon bonds are reactive and capable of undergoing radical coupling, addition, polymerization, or intramolecular cross-linking reaction in the presence of the curing agent under curing conditions. Examples of unsaturated carbon-carbon bonds include but are not limited to alkenyl group, ethylenic group, acrylic acid group, alkynyl groups, acrylate and methacrylate functional group.

In some embodiments, the organosiloxane compound comprises one or more curable or cross-linkable group covalently linked to the organosiloxane compound. The curable or cross-linkable group includes but is not limited to alkyl group, unsaturated groups such as alkenyl group or carbonyl group or epoxy group, hydrogen group, carboxylic acid group, hydroxyl group, amino group, anhydride group, imide group, acryloyl group, or combinations thereof. In embodiments, the organosiloxane compound is selected from an organoalkylsiloxane, an organoalkenylsiloxane, an organohydrogensiloxane, and organoaminosilane, an organoaminooxysilane, an organoepoxysilane, an organohydroxylsilane (silanol), an organoacetoxysilane, an organoacetamidosilane, or combinations thereof.

An exemplary example of the silicon-containing composition is a Sylgard 184 two-part kit, supplied by Sigma-Aldrich, MO. The monomer or base contains an organosiloxane compound, and the curing agent/cross-linker is a catalyst stored in a separate container. The organosiloxane of the base is a polydimethylsiloxane (PDMS) macromonomer functionalized with at least two ethylenic bonds. The structure of the PDMS macromonomer is illustrated below:

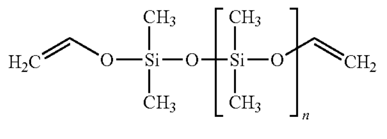

The two parts upon mixing under curing conditions, induce cross-linking of the PDMS macromonomer through intramolecular coupling reaction of the ethylenic bonds forming partially cross-linked or cross-linked polysiloxane-based elastomeric polymer matrix.

The silicon-containing compositions described herein upon curing may form a cross-linked or partially cross-linked elastomeric polymer matrix as a base for the flexible stator. For example, the Sylgard 184 upon cross-linking could result in a PDMS matrix with a tensile strength (UTS) of about 1 to about 10 MPa and a shore hardness of about 10 to about 100. The UTS, hardness and the Young's modulus (E) generally increase at a higher curing temperature or at a higher ratio of the curing agent/organosiloxane.

In some embodiments, the organosiloxane compound is from about 20 wt % to about 80 wt %, or from about 30 wt % to about 70 wt %, or from about 40 wt % to about 60 wt %, based on the total weight of the composition. In some embodiments, the weight ratio of the organosiloxane compound to the curing agent is from about 100 to about 5, or from about 50 to about 7, or from about 20 to about 10. A person of ordinary skills in the art would appreciate the weight % of the composition and the ratio of components and arrive at the desired flexibility, toughness, strength, hardness, Young's modules, or other mechanical properties through selection and optimization of various parameters.

In embodiments, the silicon-containing composition has a viscosity from about 500 cps to about 50,000 cps, or from about 1,000 cps to about 40,000 cps, or from about 2,000 cps to about 30,000 cps, or from about 2,000 cps to about 20,000 cps at 25° C. prior to curing.

The present composition comprises a plurality of magnetic particulates that when formed into a composite can be magnetized to obtain a permanent magnetic field. These particles are typically inorganic and can be ceramic. In embodiments, the magnetic particles comprises a metal element selected from a group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof. In embodiments, the magnetic particles may further comprise a chalcogen element selected from the group consisting of sulfur (S), selenium (Se), tellurium (Te), oxygen (O) and combinations thereof.

In embodiments, the magnetic particulate comprises a magnetite filling. A magnetite is a mineral, one of the two common naturally occurring oxides of iron (chemical formula $Fe_3O_4$) and a member of the spinel group. Magnetite is the most magnetic of all the naturally occurring minerals. Alnico magnet alloy is largely comprised of aluminum, iron, cobalt and nickel. Alnico is a moderately expensive magnet material because of the cobalt and nickel content. Alnico magnet alloy has a high maximum operating temperature and a very good corrosion resistance. Some grades of Alnico alloy can operate upwards of 5500° C. Samarium Cobalt (SmCo) and Neodymium Iron Boron (NdFeB) are called rare earth because Neodymium and Samarium are found in the rare earth elements on the periodic table. Both Samarium cobalt and neodymium magnet alloys are powdered metals which are compacted in the presence of a strong magnetic field and are then sintered. Ceramic magnet material (Ferrite) is strontium ferrite. Ceramic magnet material (Ferrite) is one of the most cost-effective magnetic materials manufactured in industry. The low cost is due to the cheap, abundant, and non-strategic raw materials used in manufacturing this alloy. The permanent ceramic magnets made with this material lend themselves to large production runs. Ceramic magnet material (Ferrite) has a fair to good resistance to corrosion and it can operate in moderate heat.

In other embodiments, the magnetic particles can include magnetite derived from natural iron ore or manufactured ferrite materials, or both. Ferrite is a chemical compound consisting of a ceramic inorganic oxide material. Ferric oxide commonly represented as $Fe_2O_3$ is a principal component. Ferrite materials are ferromagnetic ceramic compounds generally derived from iron oxides. Iron oxide compounds are materials containing iron and oxygen atoms. Most iron oxides do not exactly conform to a specific molecular formula and can be represented as $Fe_2O_3$ or $Fe_3O_4$ as well as compounds as $Fe_xO_y$ wherein x is about 1 to 3 and y is about 1 to 4. The variation in these numbers result from the fundamental nature of the ferric oxide material which often does not have precisely defined ratios of iron to oxygen atoms. These materials are spinel ferrites and are often in the form of a cubic crystalline structure. The crystalline usually synthetic ceramic material typically is manufactured by manufacturing a ferric oxide material and at least one other metallic oxide material generally made from a metal oxide wherein the model is a divalent metal. Such metals include for example magnesium, calcium, barium, chrome manganese, nickel, copper, zinc, molybdenum and others. The preferred metals are magnesium, calcium and barium.

In some embodiments, the magnetic particulates include ferrite materials prepared using ceramic techniques. Often the oxides are carbonates of the iron or divalent oxides are milled until a fine particulate is obtained. The fine particulate is dried and pre-fired in order to obtain the homogenous end product. The ferrite is then often heated to form the final spine crystalline structure. One useful magnetic material is known as zinc ferrite and has the formula $Zn_xFe_{3-x}O_4$. Another useful ferrite is the barium ferrite, or soft ferrites such as manganese-zinc ferrite ($Mn_xZn_{(1-x)}Fe_2O_4$) and nickel zinc ferrite $Ni_xZn_{(1-x)}Fe_2O_4$. Other useful ferrites are hard ferrites including strontium ferrite $SrFe_2O_4$, cobalt ferrite $CoFe_2O_4$.

The magnetic particulates used herein may include magnetite fillings, iron fillings, or both. In some embodiments, the magnetic particulates comprise both magnetite fillings and iron fillings, and wherein the magnetite fillings are from about 1 wt % to about 99%, or from about 20 wt % to about 80 wt %, or from about 40 wt % to about 60 wt %, or about 45 wt % to about 55 wt %, based on the total weight of the magnetic particulates. The magnetite and iron fillings may be grounded into a powder-like form. The magnetic fillings can be easily dispersed into a fluid medium. The magnetic particulates may have an average particle size in a range from about 1 nm to about 1,000 micron, or from about 10 nm to about 100 micron, or from about 100 nm to about 10 micron, or about 200 nm to about 1 micron. Preferably, the average size of the magnetic particulates is of about no greater than 1 micron, or no greater than 500 nm, or no greater than 250 nm, or no greater than 200 nm, or no greater than 100 nm, or no greater than 50 nm, or no greater than 10 nm. The average particle size may refer to magnetic particles before dispersed in the polymer matrix or particles dispersed in the cured polymer matrix or the finished stator. It is noted that individual particulate may aggregate to form a larger structure in dimension when dispersed in the polymer matrix.

In some embodiments, the composition may further comprise one or more additives. The additives include but are not limited to a compatibilizer, a colorant, a UV stabilizer, an antioxidant, a process aid, a flame retardant, a heat stabilizer, an impact modifier, a moisture scavenger, an inhibitor, an odor mask, a filler, or combinations thereof. The additives are typically known to a person having ordinary skill in the art.

The Flexible and Magnetic Stator

The finished flexible stator comprises an elastomeric polymer matrix and the magnetic particulates distributed in the polymer matrix. The present stator is ferromagnetic.

In some embodiments, the elastomeric polymer matrix of the flexible stator is a cross-linked or partially cross-linked polydimethylsiloxane (PDMS), derived from the silicon-containing composition and the magnetic particulates described herein.

In some embodiments, the elastomeric polymer matrix is a cured PDMS derived from an organosiloxane compound and a curing agent/cross-linker as described herein.

In other related embodiments, the flexible stator does not need the presence of channels to remove the heat from the stator core since the polymer/elastomer has better heat dissipation capabilities than traditional rotary systems or conventional motors. Additionally, the stator core does not need to be laminated, nor is it required that the stator contain interspaced laminations.

An exemplary example of the silicon-containing composition is a Sylgard 184 two-part kit, supplied by Sigma-Aldrich, MO. The monomer or base contains an organosiloxane compound, and the curing agent/cross-linker is a catalyst stored in a separate container. The organosiloxane of the base is a polydimethylsiloxane (PDMS) macromonomer functionalized with at least two ethylenic bonds. The structure of the PDMS macromonomer is illustrated below:

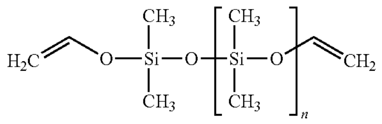

The two parts upon mixing under curing conditions, induce cross-linking of the PDMS macromonomer through intramolecular coupling reaction of the ethylenic bonds, forming partially cross-linked or cross-linked polysiloxane-based elastomeric polymer matrix. The silicon-containing compositions described herein upon curing may form a cross-linked or partially cross-linked elastomeric polymer matrix as a base for the flexible stator. For example, the Sylgard 184 upon cross-linking could result in a PDMS matrix with a tensile strength (UTS) of about 1 to about 10 MPa and a shore hardness of about 10 to about 100. The UTS, hardness and the Young's modulus (E) generally increase at a higher curing temperature or at a higher ratio of the curing agent/organosiloxane.

In some embodiments, the organosiloxane compound is from about 20 wt % to about 80 wt %, or from about 30 wt % to about 70 wt %, or from about 40 wt % to about 60 wt %, based on the total weight of the composition. In some embodiments, the weight ratio of the organosiloxane compound to the curing agent is from about 100 to about 5, or from about 50 to about 7, or from about 20 to about 10. A person of ordinary skills in the art would appreciate the weight % of the composition and the ratio of components and arrive at the desired flexibility, toughness, strength, hardness, Young's modules, or other mechanical properties through selection and optimization of various parameters.

The present flexible and magnetic stator can be made of any magnetic particulate material that when formed into a composite can be magnetized to obtain a permanent magnetic field. These particles are typically inorganic and can be ceramic as described herein. In embodiments, the magnetic particles comprises a metal element selected from a group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof. In embodiments, the magnetic particles may further comprise a chalcogen element selected from the group consisting of sulfur (S), selenium (Se), tellurium (Te), oxygen (O) and combinations thereof.

The magnetic particulates may include magnetite fillings, iron fillings, or both, as described herein. In embodiments, the magnetic particulates comprise both magnetite fillings and iron fillings, and wherein the magnetite fillings are from about 1 wt % to about 99%, or from about 20 wt % to about 80 wt %, or from about 40 wt % to about 60 wt %, or about 45 wt % to about 55 wt %, based on the total weight of the magnetic particulates. The magnetite and iron fillings may be grounded into a powder-like form. The magnetic fillings can be easily dispersed into a fluid medium. The magnetic particulates may have an average particle size in a range from about 1 nm to about 1,000 micron, or from about 10 nm to about 100 micron, or from about 100 nm to about 10 micron, or about 200 nm to about 1 micron. Preferably, the average size of the magnetic particulates is of about no greater than 1 micron, or no greater than 500 nm, or no greater than 250 nm, or no greater than 200 nm, or no greater than 100 nm, or no greater than 50 nm, or no greater than 10 nm. The average particle size may refer to magnetic particles before dispersed in the polymer matrix or particles dispersed in the cured polymer matrix or the finished stator. It is noted that individual particulate may aggregate to form a larger structure in dimension when dispersed in the polymer matrix.

In some embodiments, the flexible stator may further comprise one or more additives. The additives include but are not limited to a compatibilizer, a colorant, a UV stabilizer, an antioxidant, a process aid, a flame retardant, a heat stabilizer, an impact modifier, a moisture scavenger, an inhibitor, an odor mask, a filler, or combinations thereof.

In some embodiments, the magnetic particulates may be homogeneously distributed, or substantially homogeneously distributed, in the polymer matrix or the finished stator. Homogeneous distribution means that the density of the magnetic particulate (e.g., number of particulates/unit volume) is essentially the uniform or even throughout the entire stator. In alternative embodiments, the magnetic particulates may be heterogeneously distributed, or substantially homogeneously distributed, in the polymer matrix or the finished stator. Heterogeneous distribution means that the density of the magnetic particulate (e.g., number of particulates/unit volume) in at least one measurable portion of the stator is substantially different from the other portion of the stator. Distribution of the magnetic particulates may depend on sufficient mixing of the magnetic particles with the silicone-containing composition prior to curing, the control of the viscosity of the composition, the size/shape/design of the mold, the operation of molding and settling, and/or the curing conditions. While homogenous distribution may be generally preferred, heterogeneous distribution of magnetic particulates may also be intended to derive benefits for specific purposes in other manufacturing applications. A skilled artisan would appreciate the parameters and optimize the conditions to arrive at the desired distribution of the magnetic particulates.

Figure 1A:
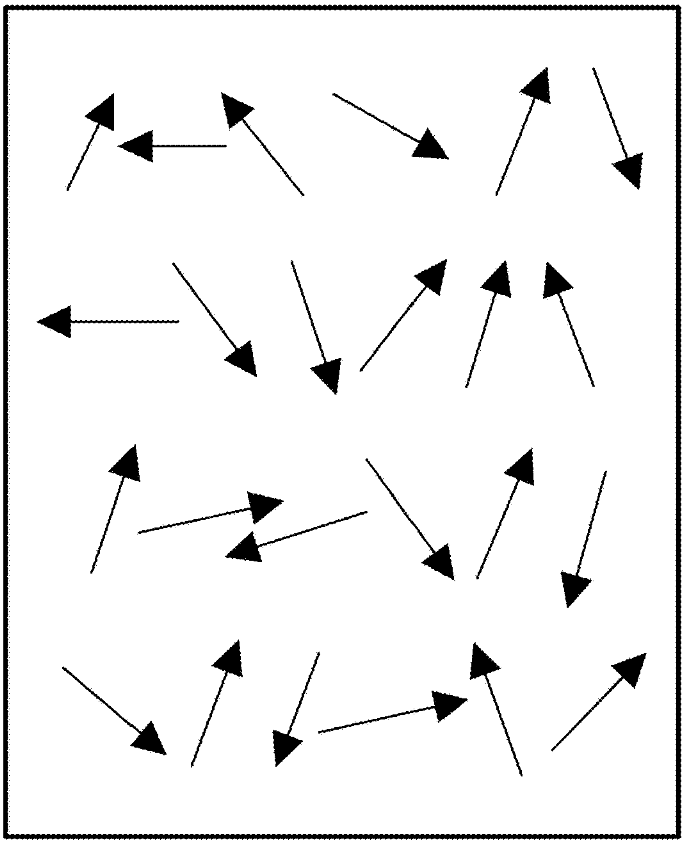
FIG. 1A illustrates the disordered ferromagnetic particles existed in nature or without an external magnetic field.

In certain embodiments, the magnetic particulates are substantially aligned in the polymer matrix of the flexible stator. In nature, ferromagnetic materials are found in a disorderly manner of the magnetic dipole moment according to their magnetic property, as shown in FIG. 1A. This is a ferromagnetic material without any applied field, the particles are in their state of minimum energy and do not have a property of magnetism when being close to another material of the same nature. However, when applying an external field either by means of a magnet, or by electric current, which upon applying an sufficient external field, the magnetic domains will break and order the particles and substantially aligned them in the polymer matrix of the stator, as shown in FIG. 1B. The substantially aligned magnetic particulates in the stator in turn generate a magnetic field. The alignment of the magnetic particulates may be achieved in the process of curing. When the particles are dispersed in the curable composition in a liquid state, the particulates with sufficient mobility could respond to an external stimulus such as a magnetic field or an elevated surrounding temperature, and thereby undergo alignment in dipole moment and remained in the aligned position upon curing and sonification of the polymer matrix. In the cross-linked polymer matrix, the particles may be substantially immobilized, remain in the aligned position, and are restricted from further re-orientation, resulting in magnetized particulates aligned in the stator, which may be permanently magnetic.

The magnetization of the stator can be measured in two directions. The direction substantially the same as the orientation direction of the magnetic dipole moment of the particles is called the easy axis. The magnetization along the easy axis will often reach the greatest magnetization or the highest magnetic field strength of the induced magnetic field. In contrast, the direction substantially perpendicular to the orientation direction of the magnetic dipole moments is called the difficult axis, which will require a greater electric current or a larger external magnetic field to for the flexible stator to generate an induced magnetic field. It was surprisingly found that the present ferromagnetic stator when used in couple with the rotating components in a motor assembly could result in much higher output values compared with the conventional motor, at least in part because the induced magnetic field generated by the magnetic particulates incorporated in the flexible stator.

In some embodiments, the flexible stator has a tensile strength (UTS) of about 1 to about 10 MPa, or about 2 to about 8 MPa, or about 3 to about 6 MPa, or about 4 to about 5 MPa. In some embodiments, the cross-linked elastomeric polymer matrix has a shore hardness of about 10 to about 100, or of about 20 to about 80, or about 30 to about 60, or about 40 to about 50.

In some embodiments, wherein the flexible stator is capable of generating a detectable magnetic field in the easy axis, or in the difficult axis, or both. In embodiments, the strength of the induced magnetic field generated by the flexible stator is of at least about 125 μT, at least about 500 μT, at least about 1,000 μT, at least about 2,000 μT, at least about 3,000 μT, or at least about 5,000 μT, or at least about 10,000 μT, in the easy axis, or in the difficult axis, or both.

Method of Making the Stators

In some aspects, the present disclosure relates to a method of making the flexible and ferromagnetic stator as described herein. In general, the method comprises forming a mixture by mixing a curable silicon-containing composition and a plurality of magnetic particulate; adding the mixture into a mold; and curing the mixture, thereby forming the stator, wherein the magnetic particulates are distributed in the stator, and wherein the stator is ferromagnetic.

In some aspects, the present disclosure relates to a method of making the flexible and ferromagnetic stator as described herein. In general, the method comprises forming a mixture by mixing a curable silicon-containing composition and a plurality of magnetic particulate; forming the mixture into a sheet, curing the mixture, and then cutting the cured sheet into a form factor. In a preferred embodiment the form factor is a stator. In at least these example embodiments, the magnetic particulates are distributed in the stator, and the stator is ferromagnetic.

In some embodiments, the curable silicon-containing composition comprises a curable or cross-linkable organosiloxane compound and a curing agent/cross-linker as described herein. In embodiments, the silicon-containing composition may be in a form of a two-part kit, with the organosiloxane compound as a monomer or a base in one container and the curing agent or cross-linker in a separate container. In embodiments of the present method, forming the mixture further comprises mixing the cross-linkable organosiloxane compound and the curing agent/cross-linker homogeneously and subsequently adding the magnetic particulates. When using, the organosiloxane compound and the curing agent are combined or mixed, allowing the cross-linking or polymerization to occur under curing conditions.

An exemplary example of the silicon-containing composition is a Sylgard 184 two-part kit, supplied by Sigma-Aldrich, MO. The monomer or base contains an organosiloxane compound, and the curing agent/cross-linker is a catalyst stored in a separate container. The organosiloxane of the base is a polydimethylsiloxane (PDMS) macromonomer functionalized with at least two ethylenic bonds. The structure of the PDMS macromonomer is illustrated below:

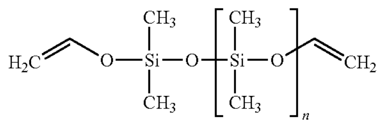

The two parts upon mixing under curing conditions, induce cross-linking of the PDMS macromonomer through intramolecular coupling reaction of the ethylenic bonds, forming partially cross-linked or cross-linked polysiloxane-based elastomeric polymer matrix.

The silicon-containing compositions described herein upon curing may form a cross-linked or partially cross-linked elastomeric polymer matrix as a base for the flexible stator. For example, the Sylgard 184 upon cross-linking could result in a PDMS matrix with a tensile strength (UTS) of about 1 to about 10 MPa and a shore hardness of about 10 to about 100. The UTS, hardness and the Young's modulus (E) generally increase at a higher curing temperature or at a higher ratio of the curing agent/organosiloxane. In some embodiments, the organosiloxane compound used in the present method is from about 20 wt % to about 80 wt %, or from about 30 wt % to about 70 wt %, or from about 40 wt % to about 60 wt %, based on the total weight of the composition. In some embodiments, the weight ratio of the organosiloxane compound to the curing agent is from about 100 to about 5, or from about 50 to about 7, or from about 20 to about 10. A person of ordinary skills in the art would appreciate the weight % of the composition and the ratio of components and arrive at the desired flexibility, toughness, strength, hardness, Young's modules, or other mechanical properties through selection and optimization of various parameters.

In embodiments, the silicon-containing composition has a viscosity from about 500 cps to about 50,000 cps, or from about 1,000 cps to about 40,000 cps, or from about 2,000 cps to about 30,000 cps, or from about 2,000 cps to about 20,000 cps at 25° C. prior to curing.

The magnetic particulates used in the present method may be any magnetic material in a particulate form that when formed into a composite can be magnetized to obtain a permanent magnetic field. These particles are typically inorganic and can be ceramic as described herein. In embodiments, the magnetic particles comprises a metal element selected from a group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof. In embodiments, the magnetic particles may further comprise a chalcogen element selected from the group consisting of sulfur (S), selenium (Se), tellurium (Te), oxygen (O) and combinations thereof.

The magnetic particulates may include magnetite fillings, iron fillings, or both, as described herein. In embodiments, the magnetic particulates comprise both magnetite fillings and iron fillings, and wherein the magnetite fillings are from about 1 wt % to about 99%, or from about 20 wt % to about 80 wt %, or from about 40 wt % to about 60 wt %, or about 45 wt % to about 55 wt %, based on the total weight of the magnetic particulates. The magnetite and iron fillings may be grounded into a powder-like form. The magnetic fillings can be easily dispersed into a fluid medium. The magnetic particulates may have an average particle size in a range from about 1 nm to about 1,000 micron, or from about 10 nm to about 100 micron, or from about 100 nm to about 10 micron, or about 200 nm to about 1 micron. Preferably, the average size of the magnetic particulates is of about no greater than 1 micron, or no greater than 500 nm, or no greater than 250 nm, or no greater than 200 nm, or no greater than 100 nm, or no greater than 50 nm, or no greater than 10 nm. The average particle size may refer to magnetic particles before dispersed in the polymer matrix or particles dispersed in the cured polymer matrix or the finished stator. It is noted that individual particulate may aggregate to form a larger structure in dimension when dispersed in the polymer matrix.

In some embodiments, the present method may further comprise adding one or more additives to the mixture. The additives include but are not limited to a compatibilizer, a colorant, a UV stabilizer, an antioxidant, a process aid, a flame retardant, a heat stabilizer, an impact modifier, a moisture scavenger, an inhibitor, an odor mask, a filler, or combinations thereof.

In some embodiments, the present method further comprises spreading the mixture evenly throughout the mold and eliminating air entrapment in the mixture prior to curing. It is important to note that the crosslinker may be much less viscous than the organosiloxane monomer/base, and the curing agent may be added slowly to the monomer during mixing with rigorous agitation in order to form a homogeneous mixture. The magnetic particulates may be added slowly in portions to the silicon-containing composition (mixed organosiloxane compound and curing agent) while continuously stirring or agitating the mixture. To avoid disfavored air bubbles and prevent them from being trapped in the mixture, the mixing may proceed carefully with adjusted speeds. The mixture may be further subject to a degassing (degasification) step to remove substantially the entrapped air bubbles prior to curing. The mold for the stator may be cleaned before the mixture is added thereto. When adding the mixture to the mold, it is suggested to start with the center of the mold and at a very short distance to minimizes the risk of trapping air, the mixture may flow and spread out through the entire mold. After adding the mixture into the mold, it is suggested to tilt the mold from one side to the other so that the mixture spreads evenly throughout the mold. It may be also important to let the mixture rest a couple of minutes on a flat surface, so that the thickness of the mixture in the mold is as homogeneous as possible throughout the entire surface and depth. Also, letting the mixture stand for a moment allows the possible bubbles trapped when the mixture was added into the mold to migrate to the surface where they can be manually burst.

The curing reaction can be carried out from temperatures below room temperature or up to 250° C. If the mold allows, the mixture can be introduced in an oven and cured at a temperature of 100° C. for about 2 hours, or at room temperature (about 20-25° C.) in a protective setting from dust or any other contamination that may fall on the surface for about 24 to about 48 hours. In some embodiments, the mixture is cured at a temperature from about 10° C. to about 200° C., or from about 23° C. to about 180° C., or from about 50° C. to about 150° C., or from about 80° C. to about 150° C., or from about 100° C. to about 120° C. for about 10 minutes to about 48 hours, or from about 30 minutes to about 24 hours, or from about 1 hour to about 12 hours, or from about 2 hours to about 6 hours. After this time has elapsed, the finished stator can be removed from the mold and placed in the motor to test its operation.

Optionally, the curing of the mixture is allowed to take place in an external magnetic field to further promote the alignment of the magnetic particulates in the mixture.

Figure 2:
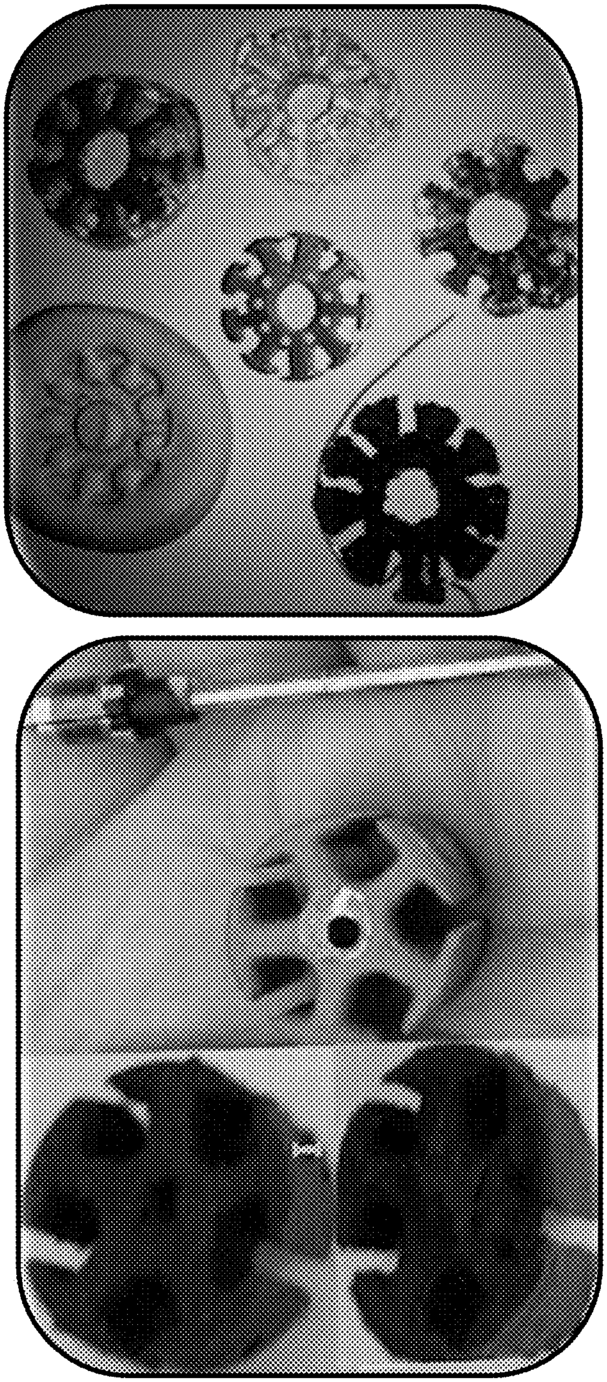
FIG. 2 illustrates example embodiments of the present flexible stator in various shapes and configurations.

Examples of the cured flexible stators are illustrated in FIG. 2

In some embodiments, the flexible stator has a tensile strength (UTS) of about 1 to about 10 MPa, or about 2 to about 8 MPa, or about 3 to about 6 MPa, or about 4 to about 5 MPa. In some embodiments, the cross-linked elastomeric polymer matrix has a shore hardness of about 10 to about 100, or of about 20 to about 80, or about 30 to about 60, or about 40 to about 50.

In some embodiments, the magnetic particulates may be homogeneously distributed, or substantially homogeneously distributed, in the polymer matrix or the finished stator made by the present method. In alternative embodiments, the magnetic particulates may be heterogeneously distributed, or substantially homogeneously distributed, in the polymer matrix or the finished stator.

In certain embodiments, the magnetic particulates are substantially aligned in the flexible stator. In the cross-linked polymer matrix, the particles may be substantially immobilized, remain in the aligned position, and are restricted from further re-orientation, resulting in magnetized particulates aligned in the stator, which may be permanently magnetic.

The ferromagnetic performance of the flexible stator can be tested by using the stator in couple with the counterpart rotary components in a stator-rotor assembly. When applying an electric current, the strength of the generated magnetic field of the stator may be measured by any conventional field tester in both the easy axis and/or the difficult axis. The magnetic force may also be calculated by the following equation:

$$F\text{(Magnetic force)}=\text{(Magnetic Field)(Length)(Electric Current)}.$$

In some embodiments, wherein the flexible stator is capable of generating a detectable magnetic field in the easy axis, or in the difficult axis, or both. In embodiments, the strength of the induced magnetic field generated by the flexible stator is of at least about 125 μT, at least about 500 μT, at least about 1,000 μT, at least about 2,000 μT, at least about 3,000 μT, or at least about 5,000 μT, or at least about 10,000 μT, in the easy axis, or in the difficult axis, or both.

The following examples are provided to further illustrate the present invention and demonstrate some advantages that arise therefrom. It is not intended that the invention be limited to the specific examples disclosed.

EXAMPLES

Certain embodiments of the present disclosure are further described with reference to the following experiments and examples. These experiments, examples, and samples are intended to be merely illustrative of the disclosure and are not intended to limit or restrict the scope of the present disclosure in any way and should not be construed as providing conditions, parameters, reagents, or starting materials that must be utilized exclusively in order to practice the art of the present disclosure.

Stator Examples 1 and 2 were prepared according to the compositions shown in Table 1. Briefly, Sylgard 184, a two-part composition having monomer (Part A) and a curing agent (Part B) was used to prepare a curable silicon-containing composition. Upon curing, Sylgard 184 formed a PDMS elastomeric polymer matrix. The magnetite fillings and iron fillings are proprietary materials derived from the Colima mine with an average size of about about 500 nm to about 700 nm. For preparation a clean container, such as a plastic cup is used. One part of cross-linker is added by ten parts of monomer. It is advisable to start with the cross-linker since it is less viscous, which makes it harder to pour the exact amount into the mold. The quantities to be prepared may vary depending on the mold we use and the thickness it is desired to obtain in the stator. For Example 1, the stator mold used for the engine needed about 30 g of monomer per about 3 g of curing agent, about 30 g of magnetite fillings and about 30 g of iron filings, resulting in a total of about 93 g weight of the stator made with PDMS.

TABLE 1

The starting materials for making the present flexible stator examples.

| Starting material | Origination | Example 1 composition (weight in grams) | Example 2 composition (weight in grams) |
|---|---|---|---|
| Sylgard 184, Part A: monomer | Sigma-Aldrich, St. Louis, MO. | 3 | 3 |
| Sylgard 184, Part B: monomer | Sigma-Aldrich, St. Louis, MO. | 30 | 30 |
| Magnetite fillings | Commercial source | 30 | 15 |
| Iron fillings | Commercial source | 30 | 15 |

Next, mixing of the monomer and the curing agent (cross-linker) was done manually using a plastic spoon. The mixing was done for approximately about 5 minutes. It was advisable to be careful to mix the components well to obtain a homogeneous mixture. It is important to note that the curing agent was much less viscous than the monomer and that it was also added in smaller amounts. The mixing of both components proceeded carefully. After mixing the monomer and the curing agent, magnetite filings and iron filings were added one by one while mixing until a homogeneous consistency was obtained.

Next, the mixture of polydimethylsiloxane (PDMS), magnetite filings, and iron filings were added into the mold. The mold was previously cleaned. The PDMS has a relatively low viscosity, which made it flow smoothly. The mixture was added to the center of the mold and at a very short distance so as to minimize the risk of trapping air. The PDMS was allowed to flow and spread out throughout the entire mold.

After the PDMS was transferred into the mold, the mold was tilted from one side to the other to further allow the mixture to spread evenly throughout the mold. It is important to let the elastomer rest a couple of minutes on a flat surface, so that the thickness of the substrate became as homogeneous as possible throughout the surface and the depth. Also, the PDMS was allowed to stand for a moment, which allowed the possible bubbles trapped when the mixture was added into the mold to migrate to the surface where they can be manually burst.

The curing reaction was carried out at about 100° C. for about 2 hours, or at about 60° C. for about 6 hours, or at a room temperature for about 24 hours. The cured stator was then removed from the mold and placed in the motor to test its operation.

Figure 3:
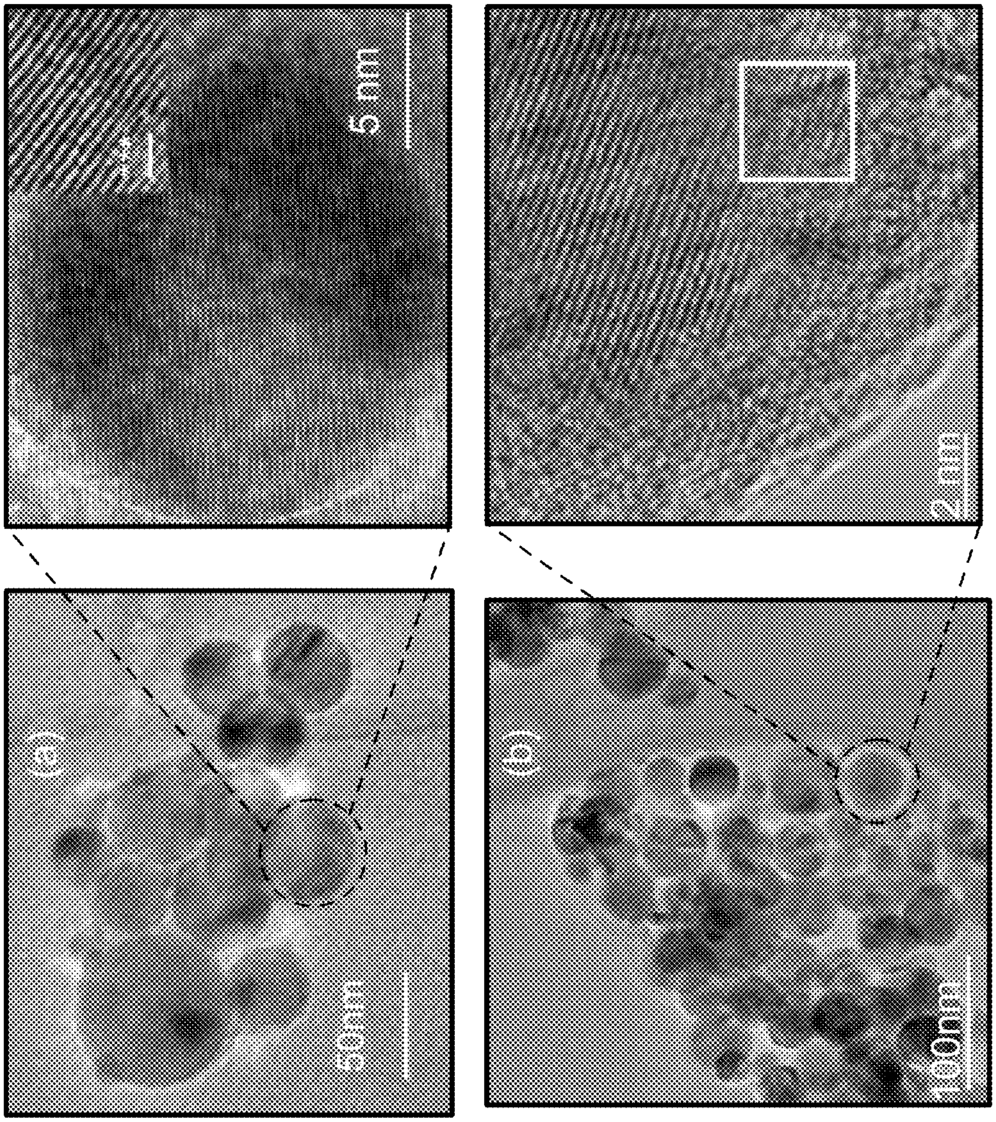
FIG. 3 shows Transmission Electron Micrograph (TEM) images of samples of the present stator (Example 1).

Samples of Example 1 stator was further analyzed using Transmission Electron Micrograph (TEM). As shown in FIG. 3, the magnetic nanoparticles are apparently incorporated in the stator and are substantially aligned.

The prepared flexible stators were tested in a motor assembly. The strength of the magnetic field generated by the stators were measured using an Electromagnetic Field Tester EMF-827. It was surprisingly found that the magnetic strength generated by the present stator Example 1 had reached much higher values than what could be measured with the conventional motor. As shown in Table 2, in comparison with the motor without the flexible stator, without changing the motor structure and the geometry and without replacing the winding or changing parameters other than the stator by a flexible stator, the magnetic field generated by Example 1 reached values that even exceeded the scale of the measurement system. In other words, under the same conditions a larger magnetic field was generated, which made the motor assembly more efficient at lower cost, at a lower weight, without even considering the manufacture of a stator already with the particles aligned from the beginning. By obtaining these values much larger than those of the conventional motor, it allows to further calculate the force they produced, and surprisingly, the force (F) was found to increase by much more 100% than the conventional motor. The above unexpected results confirm the improvement of efficiency and manufacturing convenience of the present ferromagnetic stator.

TABLE 2

Comparison of a conventional motor with a motor with the present stator (Example 1).

| CONVENTIONAL MOTOR (WITHOUT THE PRESENT STATOR) | MOTOR WITH STATOR OF POLYMER AND PARTICLES FERROMAGNETICS |
| --- | --- |
| Current 3.8 A | Current 3.8 A |
| Voltage 110 V, 240 V. | Voltage 110 V, 240 V. |
| Magnetic Field (Electromagnetic Field Tester EMF-827) | Magnetic Field (Electromagnetic Field Tester EMF-827) |
| Easy axis 124 μT | Easy axis ≥2000 μT |
| Difficult axis 97 μT | Difficult axis ≥2000 μT |
| F = (Magnetic Field) (Length) (Electric Current) | F = (Magnetic Field) (Length) (Electric Current) |
| F = 0.01566 Newtons | F = 0.252689 Newtons |

Although only exemplary embodiments of the present disclosure have been described in detail above, those skilled in the art will readily appreciate that many modifications are possible without materially departing from the novel teachings and advantages of this invention. Accordingly, all such modifications are intended to be included within the scope of this disclosure as defined in the following claims.

What is claimed is:

1. A method of making a flexible stator, comprising:

preparing a mixture by mixing a curable silicon-containing composition and a plurality of magnetic particulate, wherein the curable silicon-containing composition comprises an organosiloxane compound and a curing agent/cross-linker, wherein the organosiloxane compound is from 20 wt % to 80 wt % based on the total weight of the mixture;

pouring the mixture into a mold or sheet; and curing the mixture, thereby forming a stator, wherein the magnetic particulates are distributed in the stator, and wherein the stator is ferromagnetic.

2. The method of claim 1, wherein forming the mixture comprises mixing the organosiloxane compound and the curing agent/cross-linker homogeneously and subsequently adding the magnetic particulates.

3. The method of claim 1, wherein the magnetic particulates comprise magnetite fillings, iron fillings, or both.

4. The method of claim 1, further comprising spreading the mixture evenly throughout the mold and eliminating air entrapment in the mixture prior to curing.

5. The method of claim 1, wherein the mixture is cured at a temperature from 10° C. to 200° C., or from 23° C. to about 180° C., or from 50° C. to 150° C., or from 80° C. to about 150° C. for 10 minutes to 48 hours.

6. The method of claim 1, wherein the organosiloxane compound is from 30 wt % to 70 wt %, or from 40 wt % to 60 wt %, based on the total weight of the mixture.

7. The method of claim 1, wherein the weight ratio of the organosiloxane compound to the curing agent is from 100 to 5, or from 50 to 7, or from 20 to 10.

8. The method of claim 1, wherein the silicon-containing composition has a viscosity from 500 cps to 50,000 cps, or from 1,000 cps to 40,000 cps, or from 2,000 cps to 30,000 cps, or from 2,000 cps to 20,000 20 cps at 25° C. prior to curing.

9. The method of claim 1, wherein the magnetic particulates comprise a metal element selected from a group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), 30 palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof.

10. The method of claim 1, wherein the magnetic particulates comprise a chalcogen element selected from the group consisting of sulfur(S), selenium (Se), tellurium (Te), oxygen (O) and combinations thereof.

11. The method of claim 1, wherein the magnetic particulates have an average particle size of 1 nm to 1,000 micron, or from 10 nm to 100 micron, or from 100 nm to 10 micron, or 200 nm to 1 micron.

12. The method of claim 1, wherein the magnetic particulates have an average particle size of no greater than 1 micron, or no greater 500 nm, or no greater than 250 nm, or no greater than 200 nm, or no greater than 100 nm, or no greater than 50 nm, or no greater than 10 nm.

13. The method of claim 1, wherein the magnetic particulates are in a range from 20 wt % to 80 wt %, or from 30 wt % to 70 wt %, or from 40 wt % to 60 wt %, based on the total weight of the composition.

14. The method of claim 1, further comprising adding one or more additives to the mixture, wherein the additives are selected from a compatibilizer, a colorant, a UV stabilizer, an antioxidant, a process aid, a flame retardant, a heat stabilizer, an impact modifier, a moisture scavenger, an inhibitor, an odor mask, a filler, or combinations thereof.

15. The method of claim 1, wherein the magnetic particulates are distributed heterogeneously in the stator.

16. The method of claim 1, wherein the magnetic particulates are substantially aligned in the stator.

* * * * *